United States Patent [19]
Nishimura

[11] Patent Number: 5,568,547
[45] Date of Patent: Oct. 22, 1996

[54] SUBSCRIBER CIRCUIT PROVIDED WITH A CIRCUIT FOR MONITORING A SUBSCRIBER INSTRUMENT

[75] Inventor: Kouichi Nishimura, Tokyo, Japan

[73] Assignee: NEC Corporation, Tokyo, Japan

[21] Appl. No.: 261,281

[22] Filed: Jun. 15, 1994

[30] Foreign Application Priority Data

Jun. 15, 1993 [JP] Japan .................................. 5-142474

[51] Int. Cl.[6] ..................................................... H04M 3/22
[52] U.S. Cl. ........................... 379/382; 379/32; 379/377; 379/385; 379/413
[58] Field of Search ..................... 379/350, 377, 379/382, 385, 399, 407, 413, 27, 32, 33

[56] References Cited

U.S. PATENT DOCUMENTS

| | | | |
|---|---|---|---|
| 4,158,109 | 6/1979 | Dijkmans et al. | 379/385 |
| 4,164,713 | 8/1979 | Brolin et al. | 379/382 |
| 4,297,531 | 10/1981 | Dalhof et al. | 379/377 |
| 4,446,338 | 5/1984 | Rosch | 379/385 |
| 4,455,456 | 6/1984 | Cochran | 379/382 |
| 4,709,296 | 11/1987 | Hung et al. | 379/412 X |
| 4,802,207 | 1/1989 | Uchida | 379/350 |
| 4,937,851 | 6/1990 | Lynch et al. | 379/6 |
| 5,138,658 | 8/1992 | Carter et al. | 379/413 |
| 5,287,404 | 2/1994 | Pepper et al. | 379/377 |
| 5,293,420 | 3/1994 | Nagato | 379/382 |
| 5,337,354 | 8/1994 | Gadsby | 379/399 |
| 5,414,386 | 5/1995 | Adachi et al. | 381/94 X |

FOREIGN PATENT DOCUMENTS

| | | | |
|---|---|---|---|
| 60-116264 | 6/1985 | Japan | 379/350 |
| 01-117454 | 5/1989 | Japan | 379/375 |

*Primary Examiner*—Thomas W. Brown
*Assistant Examiner*—Scott L. Weaver
*Attorney, Agent, or Firm*—Foley & Lardner

[57] ABSTRACT

A subscriber circuit comprising a monitor circuit operating with a power supply voltage supplied to a subscriber instrument and monitoring an operation of the subscriber instrument for generating a monitor signal indicative of the result of monitor, and a power supply voltage abnormality detecting circuit receiving the power supply voltage supplied to the subscriber instrument, for generating an active abnormality detection signal when the power supply voltage deviates from a predetermined voltage range. In response to the active abnormality detection signal, the monitor circuit is inhibited from outputting the monitor signal

2 Claims, 3 Drawing Sheets

SUBSCRIBER CIRCUIT PROVIDED WITH A CIRCUIT FOR MONITORING A SUBSCRIBER INSTRUMENT

BACKGROUND OF THE INVENTION

1. Field of the Invention

The present invention relates to a subscriber circuit, and more specifically to a subscriber circuit having a function for monitoring operation of a subscriber instrument such as a telephone set.

2. Description of Related Art

A subscriber circuit includes a monitor circuit for monitoring various operations of a subscriber instrument such as a telephone set. Referring to FIG. 1, there is shown a circuit diagram of a typical example of a hook monitor circuit, which is one of monitor circuits and which first operates in the subscriber circuit when a subscriber makes a telephone call.

The shown hook monitor circuit is generally designated with Reference Numeral 1A, and connected to a pair of subscriber lines "Tip" and "Ring" which are interconnected within a telephone set when a handset is lifted (off hook). The shown hook monitor circuit includes a resistor $R_{11}$ connected at its end to the subscriber line "Tip" and another resistor $R_{12}$ connected at its end to the subscriber line "Ring", an amplifier $A_1$ having an output connected to the other end of the resistor $R_{11}$, an amplifier $A_2$ having an output connected to the other end of the resistor $R_{12}$, and a power feeding controlling circuit 11 for detecting a level on each of the subscriber line "Tip" and the subscriber line "Ring", so as to supply a predetermined level of power supply voltage to the subscriber telephone set through the amplifiers $A_1$ and $A_2$, the resistors $R_{11}$ and $R_{12}$ and the subscriber lines "Tip" and "Ring".

The shown hook monitor circuit also includes an amplifier $A_3$ for detecting and amplifying a voltage across the resistor $R_{11}$, an amplifier $A_4$ for detecting and amplifying a voltage across the resistor $R_{12}$, an adder 12 for summing output voltages of the amplifiers $A_3$ and $A_4$, and a comparator 13A for comparing an output voltage of the adder 12 with a reference voltage $Vr_{11}$ and for generating an active hook monitor signal HS when the output voltage of the adder 12 becomes higher than the reference voltage $Vr_{11}$.

The amplifiers $A_1$ to $A_4$ and the power feeding controlling circuit 11 operate with a power supply voltage Vbb of –48 V, which is the same level as that of a voltage supply for supplying an electric power to the telephone set. However, the comparator 13A operates with a power supply voltage Vcc of +5 V, which is the same as an operating power supply voltage for signal processing and controlling circuits (called "internal circuits" hereinafter) within the telephone set. Accordingly, the power supply voltage Vcc is different from the power supply voltage Vbb.

In the above mentioned hook monitor circuit 1A, when the handset of the subscriber telephone set is hooked off or lifted off, the subscriber lines "Tip" and "Ring" are interconnected within the telephone set, so that there is formed a closed loop composed of the power feeding controlling circuit 11→the amplifier $A_1$→the resistor $R_{11}$→the subscriber line "Tip"→the subscriber line "Ring"→the resistor $R_{12}$→the amplifier $A_2$→the power feeding controlling circuit 11, and a loop current flows through the closed loop thus formed. This loop current causes a voltage drop across each of the resistors $R_{11}$ and $R_{12}$, and the voltage drop is detected and amplified by each of the amplifiers $A_3$ and $A_4$. The two amplified voltage drops are summed by the adder 12, and then, supplied to the comparator 13A. In this comparator 13A, the output voltage of the adder 12 is compared with the reference voltage $Vr_{11}$ predetermined by a voltage source $E_{11}$.

The comparator 13A generates an active hook monitor signal HS (high level) when the output voltage of the adder 12 becomes higher than the reference voltage $Vr_{11}$ and an inactive hook monitor signal HS (low level) when the output voltage of the adder 12 becomes lower than the reference voltage $Vr_{11}$. In the off-hook condition, since the voltage drop across the resistors $R_{11}$ and $R_{12}$ are large because of the loop current, the comparator 13A ordinarily generates the active hook monitor signal HS of the high level.

In the conventional subscriber circuit as mentioned above, if the power supply voltage Vbb (ordinarily, –48 V) supplied to the amplifiers $A_1$ to $A_4$ and the power feeding controlling circuit 11 of the hook monitor circuit 1A as well as the other subscriber instruments drops to a level (for example, –30 V) which is out of a normal operation voltage range of these amplifiers and power feeding controlling circuit, the amplifiers $A_1$ to $A_4$ and the power feeding controlling circuit 11 no longer normally operate, and an error hook signal having an abnormal level is often generated.

SUMMARY OF THE INVENTION

Accordingly, it is an object of the present invention to provide a subscriber circuit which has overcome the above mentioned defect of the conventional one.

Another object of the present invention is to provide a subscriber circuit having a monitor circuit capable of generating only a monitor signal of a normal monitor level.

The above and other objects of the present invention are achieved in accordance with the present invention by a subscriber circuit comprising a monitor circuit operating with a power supply voltage supplied to a subscriber instrument and monitoring an operation of the subscriber instrument for generating a monitor signal indicative of the result of monitor, a power supply voltage abnormality detecting circuit receiving the power supply voltage supplied to the subscriber instrument, for generating an active abnomality detection signal when the power supply voltage deviates from a predetermined voltage range, and means responding to the active abnormality detection signal for inhibiting the monitor circuit from outputting the monitor signal.

The above and other objects, features and advantages of the present invention will be apparent from the following description of preferred embodiments of the invention with reference to the accompanying drawings.

DESCRIPTION OF THE PREFERRED EMBODIMENTS

Figure 1:
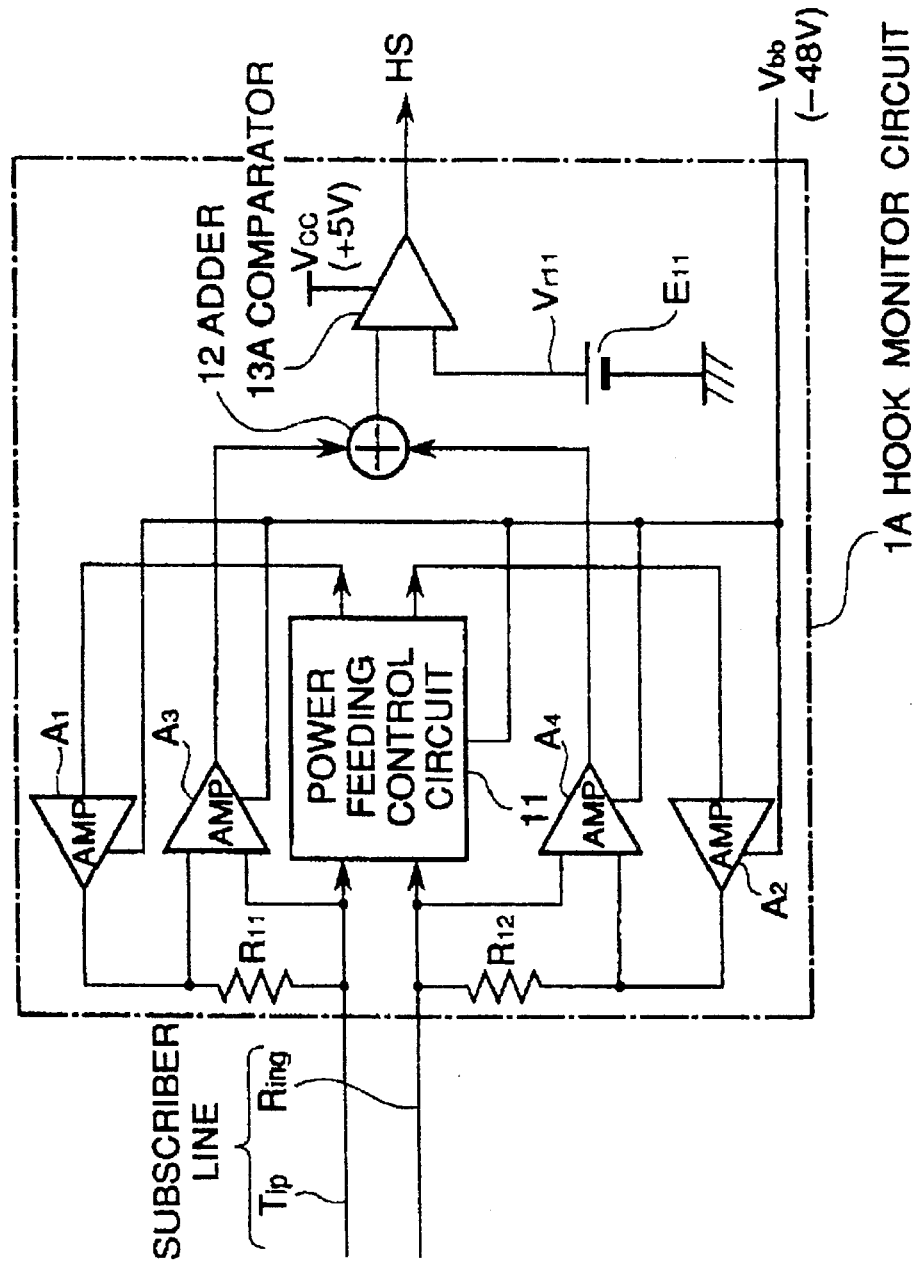
FIG. 1 is a circuit diagram of one example of the conventional subscriber circuit.
Figure 2:
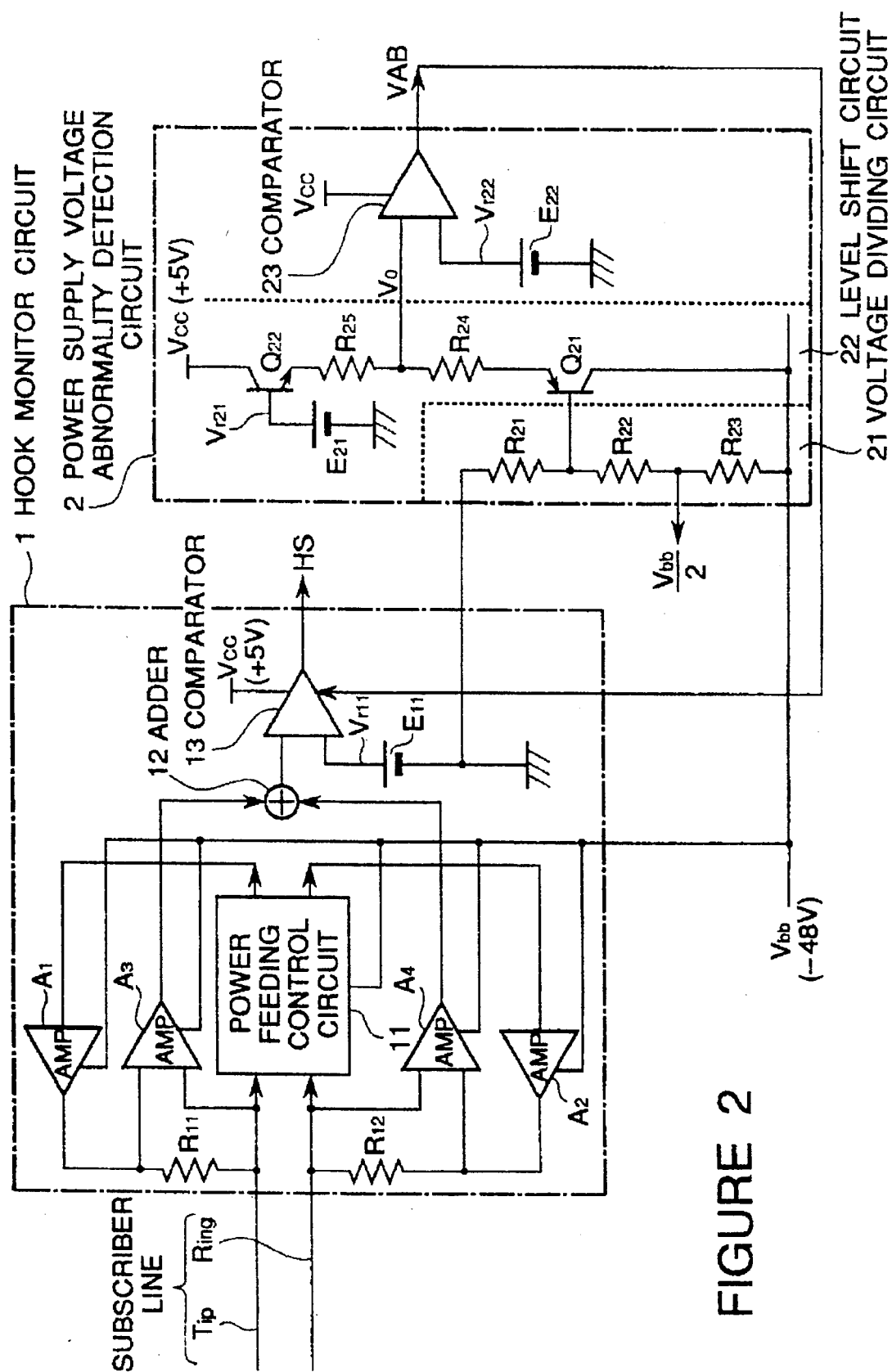
FIGS. 2 is a circuit diagram of one embodiment of the subscriber circuit in accordance with the present invention, including a power supply voltage abnormality detecting circuit.

Referring to FIG. 2, there is shown a circuit diagram of one embodiment of the subscriber circuit in accordance with the present invention, including an power supply voltage abnormality detecting circuit. In FIG. 2, elements corresponding or similar to those shown in FIG. 1 are given the same Reference Numerals, and explanation thereof will be omitted for simplification of description.

This embodiment is different from the conventional subscriber circuit shown in FIG. 1, in that it comprises a power supply voltage abnormality detecting circuit 2 generating an abnormality detection signal VAB, and a comparator 13 of a hook monitor circuit 1 has a control input receiving the active abnormality detection signal VAB, so that when the abnormality detection signal VAB is active, the comparator 13 is inhibited from outputting the monitor signal HS.

The power supply voltage abnomality detecting circuit 2 includes a voltage dividing circuit 21, which is composed of three series-connected resistors $R_{21}$, $R_{22}$ and $R_{23}$ connected between the ground level and the power supply voltage Vbb for the subscriber instruments, in the named order from the ground level. A divided voltage is picked up from a connection node between the resistors $R_{21}$ and $R_{22}$, and a voltage of Vbb/2 is obtained from a connection node between the resistors $R_{22}$ and $R_{23}$. The power supply voltage abnormality detecting circuit 2 also has a level shift circuit 22, which includes a PNP transistor $Q_{21}$ having a base connected to the connection node between the resistors $R_{21}$ and $R_{22}$ and a collector connected to the power supply voltage Vbb, an NPN transistor having a base connected to a reference voltage source $E_{21}$ so as to receive a reference voltage $Vr_{21}$ and a collector connected to the power supply voltage Vet for the internal circuits, and two series-connected resistors $R_{24}$ and $R_{25}$ connected between emitters of the transistors $Q_{21}$ and $Q_{22}$, so that a level-shifted voltage Vo is obtained from a connection node between the resistors $R_{24}$ and $R_{25}$.

The connection node between the resistors $R_{24}$ and $R_{25}$ is connected to a first input of a comparator 23, which is driven with the power supply voltage Vcc, and which has its second input connected to a reference voltage source $E_{22}$ so as to receive a reference voltage $Vr_{22}$. Accordingly, the comparator 23 compares the level-shifted voltage Vo with the reference voltage $Vr_{22}$ and generates an active or inactive abnormality detection signal VAB on the basis of the result of the comparison.

Now, operation of this embodiment will be described. In the voltage dividing circuit 21 and the level shift circuit 22, the power supply voltage Vbb is voltage-divided and level-shifted into a level which can be easily handled in the comparator 23 that operates with the power supply voltage Vcc for the internal circuits. In addition, the voltage of Vbb/2 generated in the voltage dividing circuit 21 can be used in the power feeding controlling circuit 11. For example, in the case of dividing the power supply voltage Vbb into ¼ and obtaining the voltage of Vbb/2, resistance values of the resistors $R_{21}$, $R_{22}$ and $R_{23}$ are set to have a ratio of 1:1:2. At this time, the output voltage Vo of the level shift circuit 22 is expressed as follows:

$$Vo=\{Vr_{21}-Vbe(Q_{22})\}\times R_{24}/(R_{24}+R_{25}) +\{Vbb/4+Vbe(Q_{21})\}\times R_{25}/(R_{24}+R_{25})$$

where $Vbe(Q_{22})$ and $Vbe(Q_{21})$ are a base-emitter voltage of the transistors $Q_{21}$ and $Q_{22}$, respectively, and are ordinarily on the order of 0.7 V, and $R_{24}$ and $R_{25}$ are resistances of the resistors $R_{24}$ and $R_{25}$, respectively.

Here, it is assumed that it is judged that it is abnormal when the power supply voltage Vbb of normally –48 V drops to –32 V. Assuming that $Vr_{21}=5$ V and $R_{24}$: $R_{25}$ 5:1, it becomes Vo=1.7 V in a normal condition and Vo=2.4 V in an abnormal condition. These voltage levels can be easily handled in the comparator 23.

The output voltage Vo of the level shift circuit 22 is compared with the reference voltage $Vr_{22}$ in the comparator 23. For example, if the reference voltage $Vr_{22}$ is set to be slightly lower than 2.4 V, the comparator 23 outputs an inactive abnormality detection signal VAB in a normal condition and an active abnormality detection signal VAB in an abnormal condition, in the case of an example having the above mentioned numerical values.

For example, an output stage of the comparator 13 of the hook detection circuit 1 is composed of a CMOS structure including a transistor which is rendered off in response to the active abnormality detection signal VAB. With this arrangement, when the abnormality detection signal VAB is active, the monitor signal HS is prevented from being outputted from the comparator 13, and an output of the comparator 13 is put in a high impedance condition, so that the output of the comparator 13 is isolated from a next stage circuit. Accordingly, although the monitor signal no longer assumes a normal monitor signal level because of the drop of the power supply voltage Vbb, no erroneous monitor signal is outputted, so that them occurs no adverse influence by the erroneous monitor signal.

Figure 3:
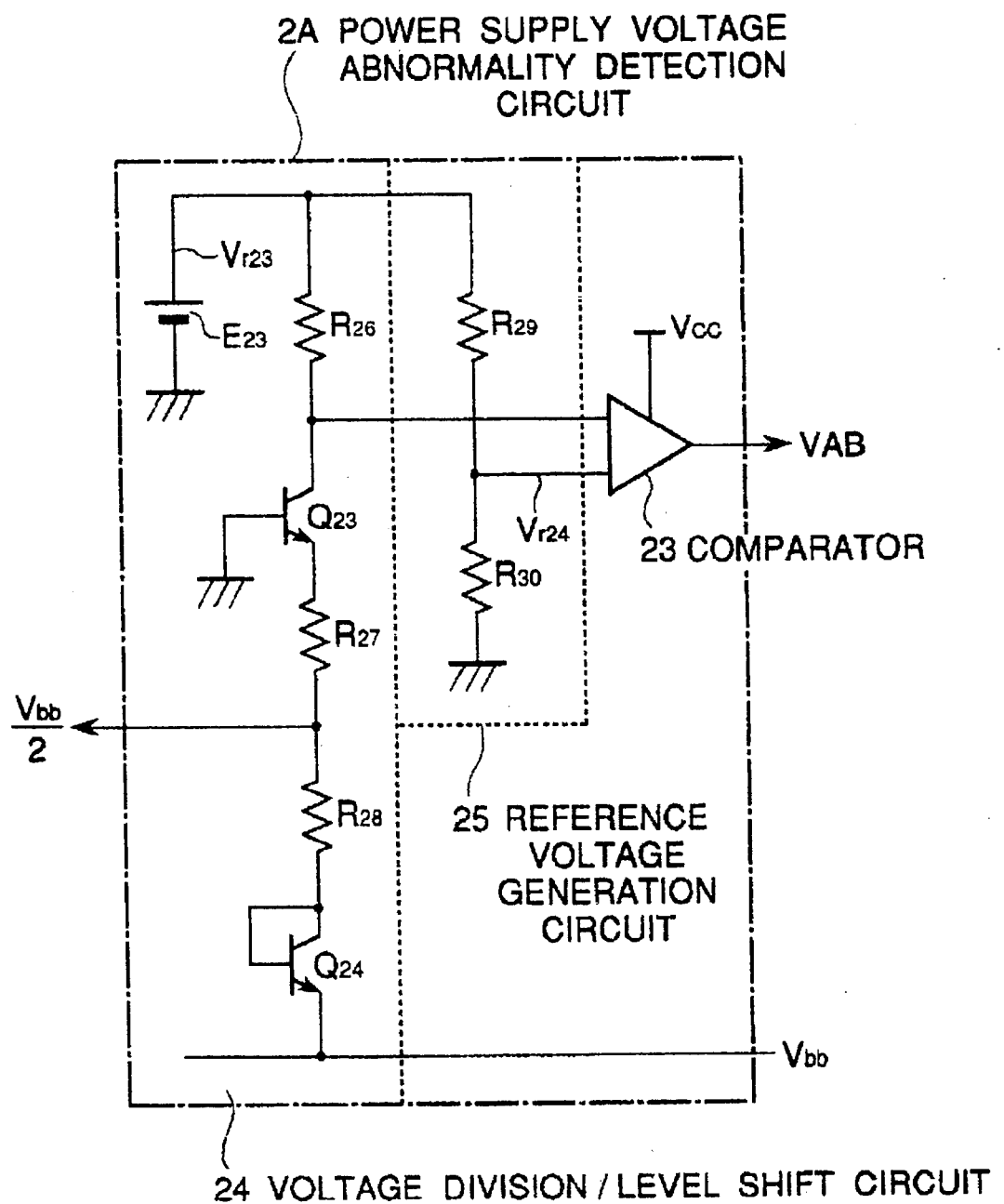
FIGS. 3 is a circuit diagram of a second embodiment of the power supply voltage abnormality detecting circuit used in the subscriber circuit in accordance with the present invention.

Referring to FIG. 3, there is shown a circuit diagram of a second embodiment of the power supply voltage abnormality detecting circuit used in the subscriber circuit in accordance with the present invention.

The second embodiment of the power supply voltage abnormality detecting circuit is generally designated with Reference Numeral 2A, and includes a voltage division and level shift circuit 24, which is composed of a resistor $R_{26}$ connected at its one end to a reference voltage source $E_{23}$ so as to receive a reference voltage $Vr_{23}$, a base-grounded NPN transistor $Q_{23}$ having its collector connected to the other end of the resistor $R_{26}$, an NPN transistor $Q_{24}$ having its emitter connected to the power supply voltage Vbb for the subscriber instruments and its base and its collector short-circuited, and two series-connected resistors $R_{27}$ and $R_{28}$ connected between an emitter of the transistor $Q_{23}$ and the collector of the transistor $Q_{24}$. With this arrangement, a voltage-divided and level-shifted voltage is obtained from a connection node between the resistor $R_{26}$ and the collector of the transistors $Q_{23}$, and a voltage of Vbb/2 is obtained from a connection node between the resistors $R_{27}$ and $R_{28}$.

The shown power supply voltage abnormality detecting circuit 2A further includes a reference voltage generation circuit 25 composed of two series-connected resistors $R_{29}$ and $R_{30}$ connected between the reference voltage source $E_{23}$ and the ground level, so that a reference voltage $Vr_{24}$ is derived from a connection node between the resistors $R_{29}$ and $R_{30}$. The connection node between the resistor $R_{26}$ and the collector of the transistors $Q_{23}$ is connected to the first input of the comparator 23, and the connection node between the resistors $R_{29}$ and $R_{30}$ is connected to the second input of the comparator 23. Accordingly, the comparator 23 compares the voltage-divided and level-shifted voltage with the reference voltage $Vr_{24}$ and generates an active or inactive abnormality detection signal VAB on the basis of the result of the comparison.

The voltage division and level shift circuit 24 has both the function of the voltage dividing circuit 21 and the function of the level shift circuit 22 in the first embodiment, but can be constructed of a small number of circuit elements in comparison with the total number of circuit elements required for the circuits 21 and 22. In addition, since the reference voltage $Vr_{24}$ for the comparator is obtained from the voltage source for the voltage division and level shift circuit 24, the number of necessary voltage sources can be reduced. On the other hand, a basic operation of the power supply voltage abnormality detecting circuit 2A is the same as that of the power supply voltage abnormality detecting circuit 2 in the first embodiment, and therefore, the power supply voltage abnormality detecting circuit 2A can exert a similar advantage. Accordingly, a further explanation will be omitted.

Furthermore, since the above mentioned embodiments are so configured that the power supply voltage abnormality detecting circuits 2 and 2A generate the voltage of Vbb/2 which is required in the monitor circuit such as the hook monitor circuits 1 and 1A, it is unnecessary to provide a circuit (power supply voltage neutral point detection circuit) for generating the voltage of Vbb/2, and therefore, the number of necessary circuit elements can be correspondingly reduced.

The invention has thus been shown and described with reference to the specific embodiments. However, it should be noted that the present invention is in no way limited to the details of the illustrated structures but changes and modifications may be made within the scope of the appended claims.

I claim:

1. A subscriber circuit comprising:

a hook monitor circuit for connection to a pair of subscriber lines for operating with a power supply voltage supplied to a subscriber instrument, said hook monitor circuit detecting a current flowing through said pair of subscriber lines in the form of a voltage and comparing said voltage with a first reference voltage, such that if said voltage is higher than said first reference voltage, said hook monitor circuit generates a monitor signal;

a power supply voltage abnormality detecting circuit for receiving said power supply voltage supplied to said subscriber instrument and for generating an active abnormality detection signal; and means for responding to said active abnormality detection signal for inhibiting said hook monitor circuit from outputting said monitor signal;

wherein said power supply voltage abnormality detecting circuit includes a voltage dividing circuit receiving said power supply voltage supplied to said subscriber instrument and outputting a voltage-divided voltage, a level shift circuit receiving said voltage-divided voltage and outputting a level-shifted voltage, and a comparator comparing said level-shifted voltage with a second reference voltage and generating said active abnormality detection signal when said level-shifted voltage is higher than said second reference voltage wherein said voltage dividing circuit includes first, second and third resistors series-connected to each other in the named order, the series connection of said first, second, and third resistors being connected between a ground level and said power supply voltage supplied to said subscriber instrument, in the named order from said ground level, so that said voltage-divided voltage is produced from a connection node between said first and second resistors, and a voltage of one half of said power supply voltage is produced at a connection node between said second and third resistors, and wherein said level shift circuit includes a first transistor with a base connected to the connection node between said first and second resistors and with a collector connected to said power supply voltage, a second transistor with a base connected to a third reference voltage and with a collector connected to a second power supply voltage, and voltage dividing circuitry connected between emitters of said first and second transistors for dividing a voltage between said emitters of said first and second transistors to supply a divided voltage as said level-shifted voltage.

2. A subscriber circuit comprising:

a hook monitor circuit for connection to a pair of subscriber lines for operating with a power supply voltage supplied to a subscriber instrument, said hook monitor circuit detecting a current flowing through said pair of subscriber lines in the form of a voltage and comparing said voltage with a first reference voltage, such that if said voltage is higher than said first reference voltage, said hook monitor circuit generates a monitor signal;

a power supply voltage abnormality detecting circuit for receiving said power supply voltage supplied to said subscriber instrument and for generating an active abnormality detection signal; and means for responding to said active abnormality detection signal for inhibiting said hook monitor circuit from outputting said monitor signal;

wherein said power supply voltage abnormality detecting circuit includes a voltage division and level shift circuit receiving said power supply voltage supplied to said subscriber instrument and outputting a voltage-divided and level-shifted voltage, and a comparator comparing said voltage-divided and level-shifted voltage with a second reference voltage and generating said active abnormality detection signal when said voltage-divided and level-shifted voltage is higher than said second reference voltage;

wherein said voltage division and level shift circuit includes a first resistor having one end connected to a third reference voltage, a base-grounded first transistor with a collector connected to the other end of said first resistor, a second transistor with an emitter connected to said power supply voltage and with a base and a collector short-circuited, and second and third resistors series-connected to each other between an emitter of said first transistor and the collector of said second transistor, so that said voltage-divided and level-shifted voltage is obtained from a connection node between said first resistor and said collector of said first transistor and is supplied to one input of said comparator, and a voltage of one half of said power supply voltage is obtained from a connection node between said second and third resistors, and wherein said subscriber circuit further includes a reference voltage generation circuit composed of fourth and fifth resistors series-connected to each other between said third reference voltage and the ground level, so that said second reference voltage is produced at a connection node between said fourth and fifth resistors and is supplied to an input of said comparator.

* * * * *